(12) United States Patent
Atake

(10) Patent No.: US 6,325,607 B1
(45) Date of Patent: Dec. 4, 2001

(54) PROCESS AND APPARATUS FOR EFFECTING INJECTION-MOLDED-IN FOIL DECORATION

(75) Inventor: Hiroyuki Atake, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/300,427

(22) Filed: Apr. 28, 1999

(30) Foreign Application Priority Data

Apr. 30, 1998 (JP) .................................................. 10-134278

(51) Int. Cl.⁷ .................................................. B29C 45/72
(52) U.S. Cl. .................. 425/122; 425/126.1; 425/127; 425/143; 425/384; 425/DIG. 48
(58) Field of Search .................................. 425/143, 122, 425/126.1, 127, 129.1, 384, DIG. 48

(56) References Cited

U.S. PATENT DOCUMENTS

| | | | |
|---|---|---|---|
| 4,140,457 | * 2/1979 | Miki et al. ............................ | 425/384 |
| 4,269,579 | * 5/1981 | Thomas ................................. | 425/111 |
| 4,360,329 | 11/1982 | Hatakeyama ........................ | 425/112 |
| 4,418,033 | 11/1983 | Hatakeyama ........................ | 264/509 |
| 4,421,481 | * 12/1983 | Holz et al. ............................ | 432/239 |
| 4,639,341 | * 1/1987 | Hanamoto et al. .................. | 264/40.1 |
| 4,663,097 | * 5/1987 | Hatfield ............................... | 264/40.7 |
| 4,994,224 | * 2/1991 | Itoh et al. ............................. | 264/247 |
| 5,262,101 | * 11/1993 | Yagi et al. ........................... | 264/40.1 |
| 5,415,536 | * 5/1995 | Ohno ..................................... | 425/121 |
| 5,676,981 | * 10/1997 | Miyazawa et al. .................. | 425/112 |
| 5,707,581 | * 1/1998 | Yamazaki ............................ | 264/511 |

FOREIGN PATENT DOCUMENTS 60-11607 3/1985 (JP) .
63-147623 * 6/1988 (JP) .

* cited by examiner

Primary Examiner—Nam Nguyen
Assistant Examiner—Emmanuel Luk
(74) Attorney, Agent, or Firm—Parkhurst & Wendell LLP

(57) ABSTRACT

A decoration sheet is fed on a mold and then is heated to a temperature above a heat distortion temperature thereof, is conformed to the surface of a cavity of the mold by vacuum drawing. Then the molds are clamped, and a resin is injected to adhere the decoration sheet to the resin. The decoration sheet is preheated to a temperature below the heat distortion temperature by sheet preheating means before fed onto the mold. The decoration sheet preheated by the sheet preheating means is fed to the mold by sheet feeding means.

7 Claims, 7 Drawing Sheets

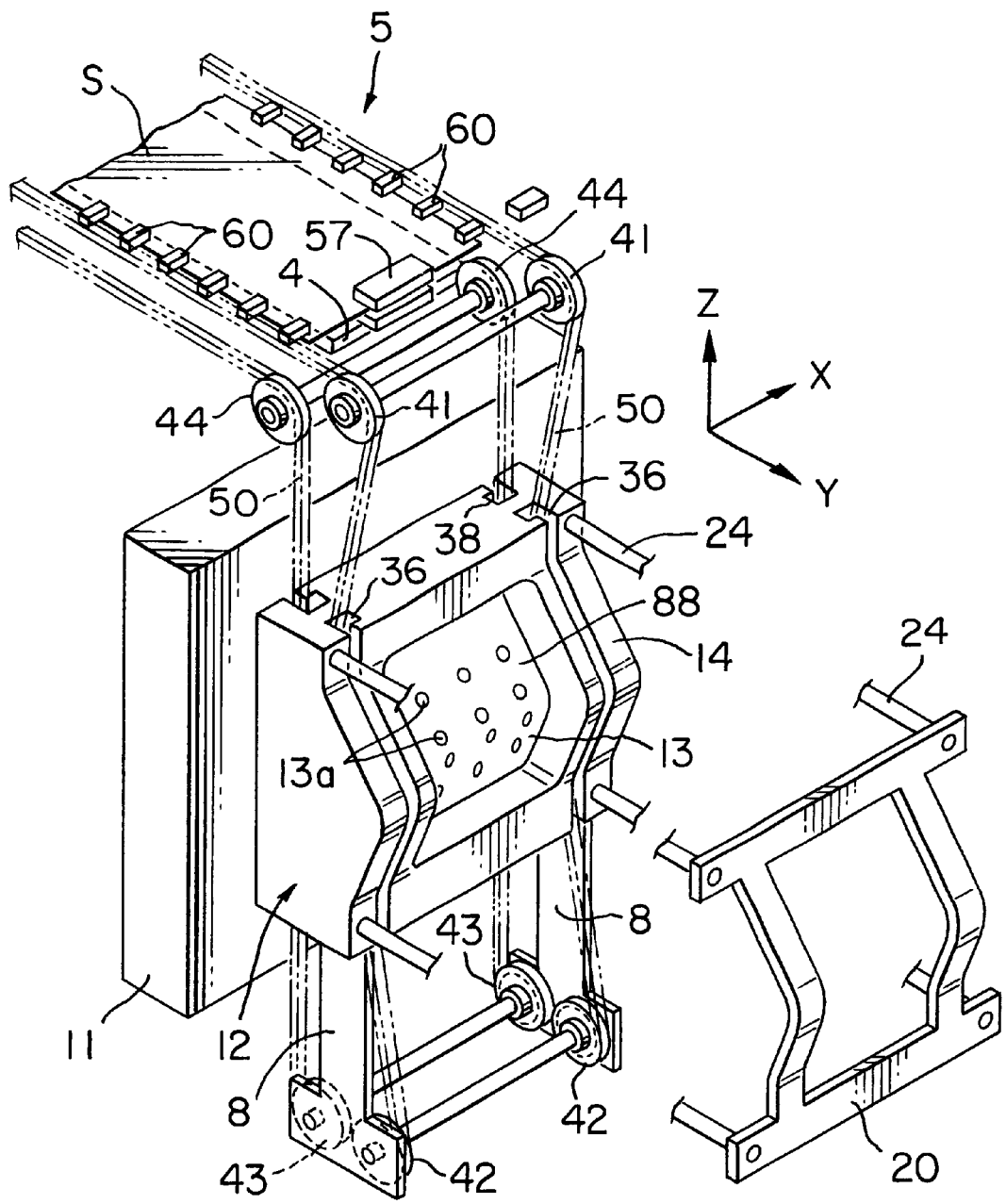
F I G. 2

PROCESS AND APPARATUS FOR EFFECTING INJECTION-MOLDED-IN FOIL DECORATION

TECHNICAL FIELD

The present invention relates to a process and an apparatus for effecting injection-molded-in foil decoration.

BACKGROUND ART

Conventionally the injection-molded-in foil decoration by which a plastic molding is formed, and simultaneously therewith patterns, etc. are applied by decoration sheet to the surface of the plastic molding being formed is performed in various modes.

For example, the bulletin of Japanese Patent Publication No. 19132/1975 discloses a process for integrating a decoration sheet with the surface of an injected molding at the same time of the injection molding, in which a female mold for vacuum forming having a vent hole is used as a vacuum forming mold, a decoration sheet is fed and set on the female mold, then is thermally softened by a hot platen to be preformed by vacuum forming and contoured to fit the cavity surface of the female mold, then the male and the female molds are clamped, next molten resin is injected in a cavity defined by both molds, and the molds are opened to take out a molding.

For example, the bulletin of Japanese Patent Laid-Open Publication No. 315950/1994 discloses a technique of decorating the surface of a molding by a decoration sheet at the same time of forming the molding, in which a web decoration sheet payed out from a roll is fed between a pair of male and female molds in their opened state and is fit at the boundary portion to the parting face of the female mold by a sheet presser frame to be thereby fed onto the female mold, then a hot platen is moved into between both molds from a withdrawn position outside the mold to be opposed to the decoration sheet fed on the mold so as to incontiguously thermally soften the same so as to preform the decoration sheet in the injection mold to contour the decoration sheet to fit the cavity surface of the female mold, then the hot platen is withdrawn to the withdrawn position outside the mold, both molds are clamped, resin is injected into the cavity defined by both molds, the molds are opened, and the molding is taken out.

In these modes, the decoration sheet is preformed by an injection mold, and the decoration sheet is thermally softened for the preforming after the decoration sheet been fed on the mold.

The bulletin of Japanese Patent Publication No. 42172/1992 discloses the technique for feeding a decoration sheet on a mold and thermally softening the same in the mode that the decoration sheet is preformed by an injection mold, in which a hot platen is reciprocated, for thermally softening the decoration sheet, between the inside of the mold and a withdrawn position thereof outside the mold, and has air holes formed in the heating surface thereof, the decoration sheet is sucked on the heating surface and further pressed fit to the heating surface by a frame member, whereby the hot platen is in the withdrawn position retains the decoration sheet on the heating surface and is moved into the mold, retaining the decoration sheet on the heating surface.

However, the modes described in the bulletins of Japanese Laid-Open Publication Nos. 19132/1975, and 315950/1994 described above and others, wherein the decoration sheet of a distortion temperature or less than the distortion temperature is fed on the mold at room temperature and then heated has a disadvantage that when a decoration sheet of good heat resistance or a thick decoration sheet is used, it takes time to heat the decoration sheet, thus causing a long cycle time, which lowers productivity.

In the bulletin of Japanese Patent Publication No. 42172/1992 described above a decoration sheet can start to be heated when the heater plate is at its withdrawn position. A heating time after the heater plate has been moved into a mold can be accordingly shorter. However, because the decoration sheet is drawn on the heating surface and retained thereon, impressions of vent holes formed in the heating surface are made on the softened decoration sheet, which makes the appearance poor. In cases of especially large decoration sheets or thick decoration sheets, sometimes vacuum for drawing and retaining the decoration sheets causes leaks, and the decoration sheets are torn off. It is difficult to completely suppress deformation and distortion of the decoration sheets when the softened decoration sheets are conveyed inbetween the male and female molds. Furthermore, when the decoration sheets are fed to the female mold which is to be a preforming mold, the heater plate releases the decoration sheets drawn thereon by suction through the vent holes and oppositely blows out compressed air through the vent holes, and in addition thereto, the decoration sheets are already heated. Accordingly, when the decoration sheets are left from the heating surface one after another at a small time interval, sometimes the decoration sheets wrinkle, or transfer of the decoration sheets is unstable. In the case where a decoration sheet has an adhesive layer on the back side, sometimes the adhesive layer remains on the heater plate.

SUMMARY OF THE INVENTION

An object of the present invention is to provide a method and an apparatus for effecting an injection molded-in foil decoration which can shorten a cycle time and can stably feed a decoration sheet on a mold.

To achieve the above-described object, the process for effecting injection-molded-in foil decoration according to the present invention comprises the steps of preheating a decoration sheet by sheet preheating means to a temperature less than a heat distortion temperature of the decoration sheet before the decoration sheet is fed to a mold having a surface defining a cavity; feeding the preheated decoration sheet to the mold in its open state; heating the decoration sheet by sheet heating means to a temperature equal to or more than the heat distortion temperature of the decoration sheet, and contouring the decoration sheet to the cavity surface of the mold by vacuum-drawing by the mold; and clamping the mold, and injecting a fluid resin into the mold to adhere the decoration sheet and the resin to each other.

As a result, a heating time for heating a preheated decoration sheet fed to the mold can be shortened, whereby a cycle time can be shortened, and high productivity can be obtained. A decoration sheet is preheated to a temperature less than a heat distortion temperature thereof, whereby deformation and distortion of the preheated decoration sheet which may take place when the preheated decoration sheet is fed to the mold are suppressed, whereby the decoration sheet can be stably fed on the mold.

In the above-described process, when the decoration sheet is fed to the mold in its open state, the decoration sheet has both side edges of the decoration sheet which are parallel with a direction of conveyance thereof, are pinched so that a widthwise length thereof normal to the direction of conveyance is kept constant. Deformation and distortion of a decoration sheet which may take place when the decoration sheet is fed onto the mold can be prevented without failure, and the decoration sheet can be fed on the mold very stably.

In the above-described process, in preheating the decoration sheet by the sheet preheating means and in heating the decoration sheet by the sheet heating means, the preheating means and heating means are spaced from the decoration sheet. A decoration sheet is precluded from fusing to the preheating means or the heating means at the adhesive layer, etc. with a result of unstable feed of the decoration sheet onto the mold. No appearance defects of the molding due to marks of contact of the decoration sheet to the heaters occurs.

In the above-described process, when the decoration sheet is preheated by the sheet preheating means, a temperature of the decoration sheet is detected by a temperature sensor, and based on a signal from the temperature sensor, and control means controls the sheet preheating means, based on a signal from the temperature sensor.

The above-described process further comprises the step of interposing a heat shield plate between the sheet preheating means and the decoration sheet after the decoration sheet has been preheated by the sheet preheating means.

In the above-described process, when the preheated decoration sheet is fed to the mold in its open state, the decoration sheet is covered with a heat insulation hood.

To achieve the above-described object, the apparatus for effecting injection-molded-in foil decoration according to the present invention comprises a mold including a cavity surface defining a cavity for a decoration sheet to be positioned, and suction means provided in the cavity surface, for vacuum-drawing the decoration sheet, a fluid resin being injected in the cavity of the mold to be adhered to the decoration sheet; sheet preheating means for preheating the decoration sheet before being fed to the mold to a temperature less than a heat distortion temperature thereof; sheet heating means for heating the decoration sheet fed in the mold to a temperature equal to or more than the heat distortion temperature thereof; and sheet feeding means for feeding the decoration sheet preheated by the sheet preheating means to the mold.

In the above-described apparatus, the sheet feeding means includes chucks for holding both side edges of the decoration sheet which are parallel with a direction of conveyance thereof. A widthwise length of a preheated decoration sheet is retained, whereby occurrence of deformation and distortion of the decoration sheet which may take place when the decoration sheet is fed on the mold can be prevented without failure, and the decoration sheet can be stably fed on the mold.

In the above-described apparatus, the sheet preheating means and the sheet heating means heats the decoration sheet, being spaced from the decoration sheet by a prescribed distance. A decoration sheet is prevented from fusing to the heaters at the adhesive layer, etc. with a result that the feed of the decoration sheet onto the mold is unstable. Defective appearances of the mold due to marks of the contact of the decoration sheet to the heaters can be prevented.

In the above-described apparatus, a temperature sensor is disposed in the vicinity of the sheet preheating means, for detecting a temperature of the decoration sheet; and control means is provided for controlling the sheet preheating means, based on the signal from the temperature sensor.

In the above-described apparatus, a heat shield plate is disposed in the vicinity of the sheet preheating means, which is movable from a position between the decoration sheet and the sheet preheating means, and a stand-by position thereof spaced from the sheet preheating means.

In the above-described apparatus, the heat shield plate is driven by a drive mechanism controlled by the control means.

In the above-described apparatus, a heat insulation hood is disposed between the sheet preheating means and the mold, for covering the decoration sheet fed by the sheet feeding means.

BRIEF DESCRIPTION OF THE DRAWINGS

FIG. 2 is a perspective view of a periphery of the preheater and the sheet feeding means.

BEST MODE FOR CARRYING OUT THE INVENTION

Figure 1:
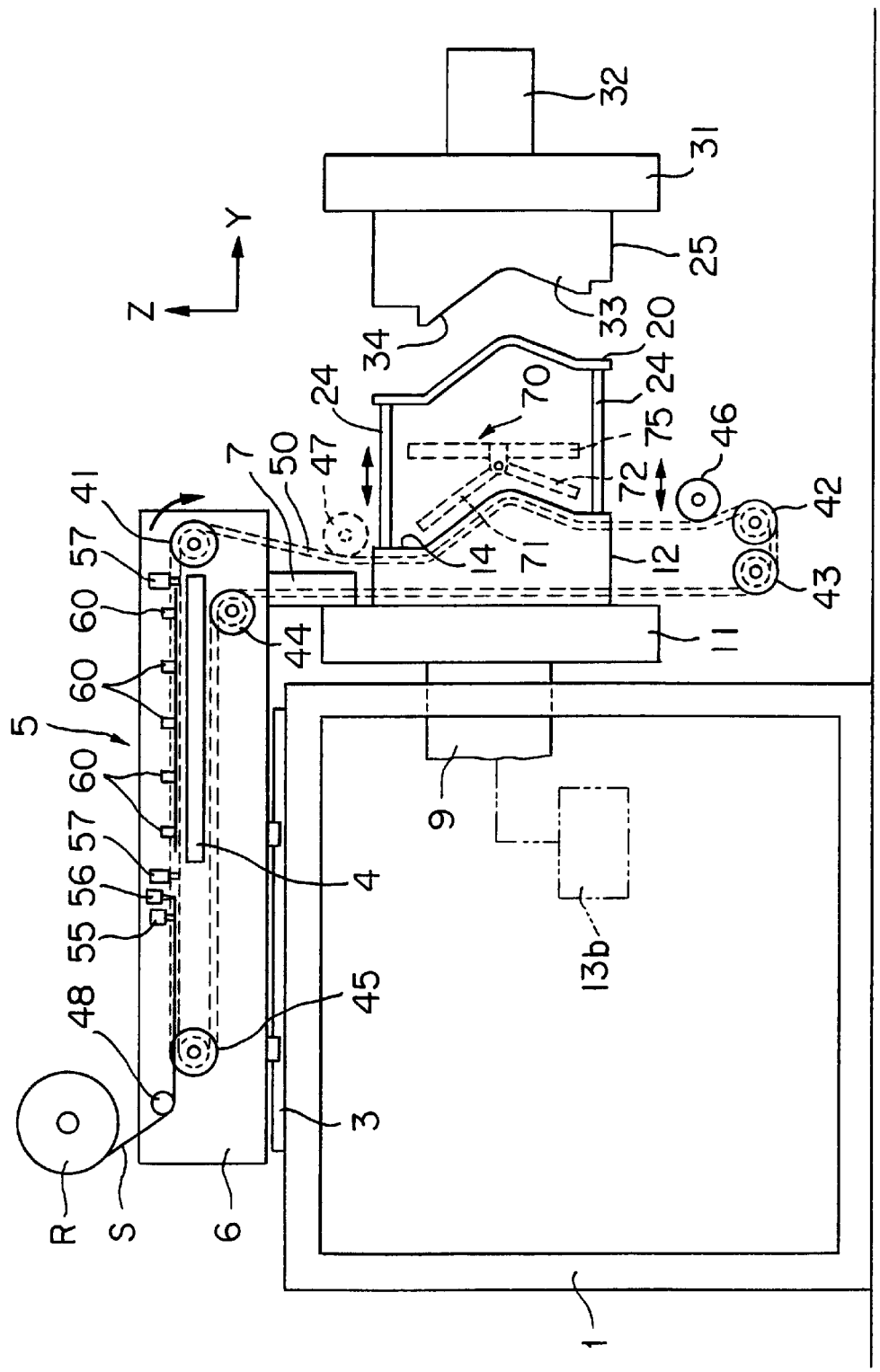
FIG. 1 is a side view of the apparatus for effecting injection-molded-in foil decoration according to the present invention, which show the general structure thereof.
Figure 3:
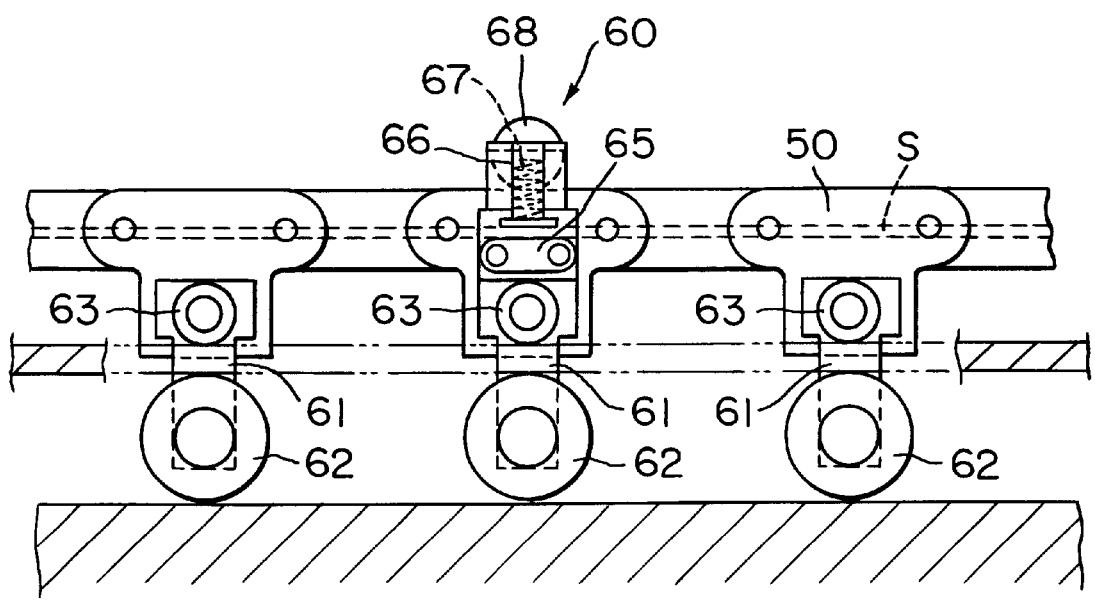
FIG. 3 is a partial enlarged view explaining the endless loop chains, the sheet pinching chucks and the guide grooves formed in the female mold.
Figure 4:
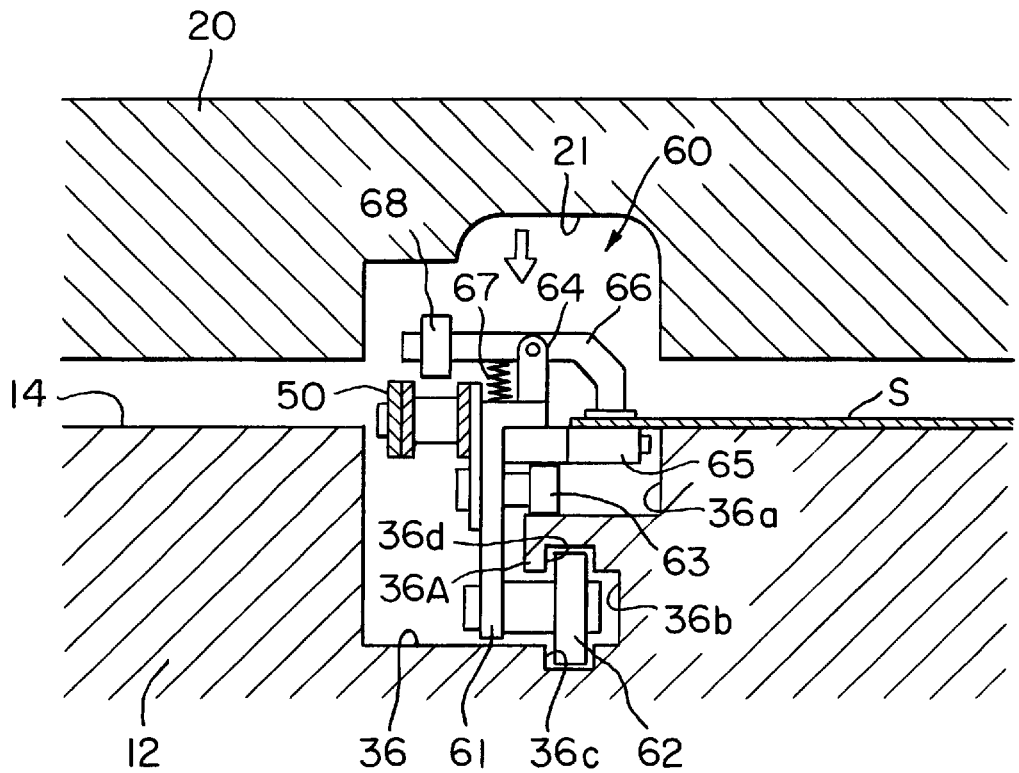
FIG. 4 is a partial enlarged sectional view explaining the endless loop chains, the sheet pinching chucks and the guide grooves formed in the female mold shown in FIG. 3.
Figure 5:
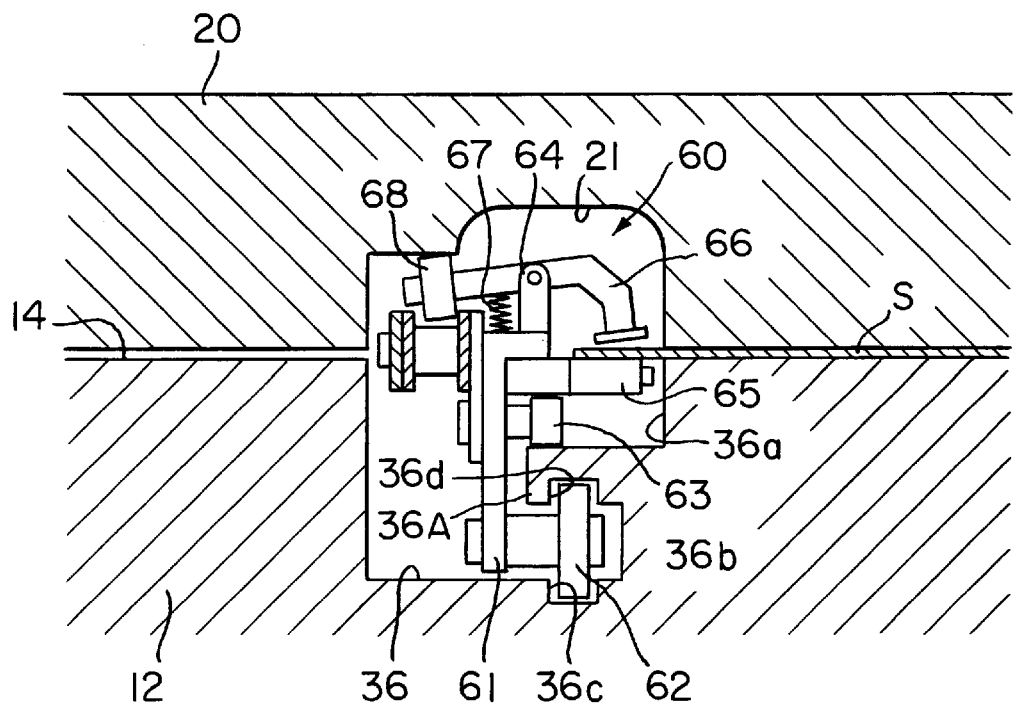
FIG. 5 is a partial enlarged sectional view of the endless loop chains and the sheet pinching chucks, which explains their operation.

A mode for carrying out the process and apparatus for effecting injection-molded-in foil decoration according to the present invention will be explained with reference to the drawings. FIGS. 1 to 5 are conceptual views of the process and the apparatus for effecting injection-molded-in foil decoration according to the present invention. FIG. 1 is a side view of the general structure of an apparatus for effecting injection-molded-in foil decoration of the present invention in the mode, which shows a general structure thereof. FIG. 2 is a perspective view of a preheater 4, sheet feed means 5 and their peripheral constitutions. FIG. 3 is a partial enlarged side view of an endless loop chain 50 and one sheet pinching chuck 60. FIG. 4 is a partial enlarged view of the endless loop chain 50 and the sheet pinching chuck 60 shown in FIG. 3, and a guide groove 36 formed in a female mold 12. FIG. 5 is a partial enlarged view of the endless loop chain 50 and the sheet pinching chuck 60, which explain an operation of the endless loop chain 50 and the sheet pinching chuck 60 in connection with a clamper 20.

The apparatus shown in FIGS. 1 to 5 uses an injection mold having a parting face 14 of a female mold for a decoration sheet to be set on formed not to be planar but curved in a convexity, bulged outward to a male mold in a substantially L-shape as viewed on a side, and enables "a modified feeding". Needless to say, in accordance with a molding shape, an injection mold having a parting face which is planar or curved, bulged inward away from a male mold may be used.

The apparatus for effecting injection-molded-in foil decoration according to the present invention exemplified in FIGS. 1 to 5 comprises at least a preheater 4 as preheating means for preheating a decoration sheet S before fed onto the mold to a temperature below a heat distortion temperature thereof, a heater 70 as sheet heating means for heating to a temperature equal to or greater than the heat distortion temperature of the preheated decoration sheet fed in the mold, sheet feeding means 5 for feeding the decoration sheet S to a preheating position by the preheater 4 and feeding the preheated decoration sheet into the mold.

The sheet feeding means 5 conveys the decoration sheet S by a pair of endless loop chains 50 having a plurality of sheet pinching chucks 60 which, when the sheet feeding means 5 feed the preheated decoration sheet S into the mold, pinch the decoration sheet S at both edges thereof parallel to a direction of conveyance of the decoration sheet S so that the preheated decoration sheet S is fed with a maintained constant widthwise length and a length parallel to the direction of conveyance thereof.

The preheater 4 and the heater 70 respectively heat the decoration sheet S, being spaced from the decoration sheets.

The apparatus for effecting injection-molded-in foil decoration according to the present invention having the constitution exemplified above is combined, as is the conventionally known conventional injection-molded-in foil decoration apparatus, with a known injection molding machine or has a mold suitably replaced for an intended molding, whereby a required decorated plastic molding decorated with the decoration sheet S can be produced.

The apparatus for effecting injection-molded-in foil decoration in the present mode is not limited to the constitution exemplified as one mode in FIGS. 1 to 5 and may basically comprise at least the sheet preheating means 4 for preheating the decoration sheet S being before fed to the mold to a temperature below the heat distortion temperature, sheet heating means 70 for heating the preheated decoration sheet S fed into the mold to a temperature equal to or above the heat distortion temperature, and the sheet feeding means 5 for feeding the decoration sheet S to a position of preheating by the preheating means 4 and feeding the preheated decoration sheet S into the mold. Various conventionally known injection-molded-in foil decoration apparatus may be applied to these constituent members and other constituent members. For example, a vacuum source, etc. for vacuum forming the decoration sheet is not essential as a constituent member.

In the process and the apparatus for effecting injection-molded-in foil decoration a web of the decoration sheet S may be preheated, heated, preformed and injection-molded. Otherwise, separate decoration sheets S are set, and preheated, heated, preformed and injection-molded. The decoration sheet S may have any form.

A mold used in the present invention is, in the mode exemplified here, an injection mold including a female mold 12 and a male mold 25, and is formed of a metal, such as iron, or ceramics. The female mold 12 is secured to a movable platen 11 of the injection molding machine. The movable platen 11 is moved forward and backward horizontally (in the Y direction) as viewed in the drawing by a ram 9 of a hydraulic cylinder, whereby the female mold 12 is brought onto and apart from the male mold 25, and a clamped state and an open mold state (the state shown in FIG. 1) are formed. The apparatus for effecting injection-molded-in foil decoration according to the present invention may be applied to a mode in which the apparatus is combined with an injection molding machine having the movable platen (the female mold 12) which is vertically movable in addition to the mode shown in FIG. 1, in which the movable platen (the female mold 12) is horizontally movable.

As shown in FIG. 2, the female mold 12 has a substantially L-shaped cavity 13 as viewed on a side, which is relatively shallow corresponding to a required decorated molding, and has a parting face 14 on the outer periphery of the cavity surface 13. The parting face 14 is curved, bulged toward the male mold (in the Y direction) in a substantial convex shape as viewed on a side. Vent openings 13a in the form of grooves or holes for vacuum forming a decoration sheet are provided in the surface 88 of the cavity 13 of the female mold 12. The vent openings 13a may be formed in an area of the parting face 14 inside O-rings provided on the parting face 14 for tight closing. The vent openings 13a are communicated with a vacuum source 13b, such as vacuum pump or others.

On the other hand, as shown in FIG. 1, the male mold 25 is secured to a stationary platen 31 of the injection molding machine. An injection nozzle 32 intrudes into the bottom of the male mold to pour resin which is fluidized by melting or other methods into a cavity 13 defined by the male and female molds when clamped. The male mold 25 has a core 33 corresponding to a shape of a required decorated molding and a parting face 34 curved inward in a concavity of a substantial L-shape as viewed on a side.

The female mold 12 has a clamper 20 for pressing a decoration sheet S against the parting face 14 of the female mold 12, and the clamper 20 is in the form of a frame of a rectangular shape as viewed at the front which is analogous to the parting face 14 and is substantially L-shaped as viewed on a side. The clamper 20 is moved to and away from the parting face 14 of the female mold 12 perpendicularly (in the Y direction) to the parting face 14 by driving by a drive mechanism (not shown) four connection rods 24 slidably inserted in through-holes formed in the female mold 12 near the four corners, so as to press against the parting face 14 the decoration sheet S fed in a gap between the parting face 14 and the clamper 20 to fix the decoration sheet S there. The feed of the decoration sheet S is completed by fixing the decoration sheet S by the clamper 20.

The sheet feeding means 5, which is a constituent member of the apparatus for effecting injection-molded-in foil decoration according to the present invention, feeds the decoration sheet S to a preheating position of preheating by the preheater 4 and then feeds the preheated decoration sheet S onto the parting face 14 of the female mold 12.

As shown in FIG. 1, the sheet feeding means 5 includes a base frame 6, and the base frame 6 is fixedly connected to the movable platen 11 by a coupling member 7. The base frame 6 is moved left-to-right as viewed in the drawing (in the Y direction) together with the female mold 12 moved upon mold opening and mold clamping, along a rail 3 provided on a support structure disposed on the left side of the female mold 12. As shown in FIG. 2, a pair of coupling plates 8 which are a part of the sheet feeding means 5 are connected to a lower part of the female mold 12. Pairs of sprocket wheels 42; 43 with the sprocket wheels 42, 42,; 43, 43 are mounted on the coupling plates 8 of the pair with the sprocket wheels 42, 42; 43, 43 of each pair horizontally opposed to each other.

A roll R of the decoration sheet S is mounted on the base frame 6, and paying-out means is provided for applying a suitable back tension to the decoration sheet S. A web of the decoration sheet S is payed out via a single one or a plurality of guide rollers 48. The base frame 6 has pairs of sprocket wheels 41; 44; 45 with the sprocket wheels of each pair horizontally opposed to each other are provided so that that of the payed-out decoration sheet S for one shot is fed onto the parting face 14 of the female mold 12 by using a pair of endless loops chains 50 horizontally opposed to each other. One pair 41, for example, of the pairs of sprocket wheels is driven by a rotational drive source (not shown), such as a stepping geared motor or others to move the endless loop chains 50. The horizontally opposed endless loop chains 50 of the pair have the same configuration of the same size and are wound on the sprocket wheels 41, 42, 43, 44, 45 in a generally L-shape as viewed on a side. Needless to say, a distance between the horizontally opposed endless loop chains 50 of the pair (a widthwise length normal to the conveyance direction) is constant.

As shown in FIGS. 3 and 4, support members 61 are provided on the endless loop chains 50 at, e.g., every two pitches, and a larger-diameter roller 62 and a smaller-diameter roller 63 are mounted on a lower part and a middle part of each support member 61. Sheet pinching chucks 60 for pinching the decoration sheet S for one shot at the widthwise edges (both side edges are parallel to the conveyance direction) are disposed on an upper part of the support members 61 at a prescribed pitch (e.g., every five pitches). A required number of the sheet pinching chucks 60 is provided on the horizontally opposed endless loop chains 50 over a prescribed range so that the sheet pinching chucks 6 can pinch a length of the decoration sheet S for one shot. The sheet feeding means 5 reciprocates the endless loop chains 50 to reciprocate the part thereof with the sheet pinching chucks 60 disposed between a paying-out position, which is a conveyance starting position of conveying a decoration sheet cut for one shot, and a feed position on the parting face 14 of the female mold 12 via the preheating position. The preheating position at which the decoration sheet S is preheated on the preheater 4 is at some distance from the paying-out position over which the decoration sheet S is conveyed (see the decoration sheet S in FIG. 1), but the paying-out position itself may be the preheating position.

The endless loop chains 50 convey one decoration sheet for one shot pinched with the sheet pinching chucks 60 onto the parting face 14 of the female mold 12, the clamper 20 presses the decoration sheet S fixedly against the parting face 14, and the feed of the decoration sheet in the mold is completed. Then, the sheet pinching chucks 60 release the decoration sheet S, the endless loop chains 50 are oppositely turned to return the sheet pinching chucks 60 to the original paying-out position, and the sheet pinching chucks 60 stand by for another shot.

As described above, in the mode of conveying the decoration sheet S in the process and the apparatus according to the present invention, which is exemplified here, the endless loop chains 50 are used as the decoration sheet conveying means 5, so that the decoration sheet S is conveyed with only both side edges thereof contacted, with the rest thereof not contacted and with the leading end thereof not pulled, whereby the decoration sheet S is free from unnecessary tension exerted in the conveyance direction during the conveyance. Accordingly, even in a case where the decoration sheet S is preheated to be fed as in the present invention, the decoration sheet S, which is preheated to a temperature which is less than a heat distortion temperature and more likely to be elongated than at room temperature, is not elongated and can be fed in a stable shape. Furthermore, this mode of conveying the decoration sheet S has an advantage that even in a case where the face (the parting face) 14 at which the decoration sheet S is fixed to the mold is nonplanar (but a two-dimensional curved face), e.g., curved in a convexity or a concavity, or others, the decoration sheet S can be securely fed. In the mode of conveying the decoration sheet S of a constant length in the conveyance direction, a lengthy body, such as a rope, a belt or others, whose length is unchangeable and can be curved, may be used in place of the endless loop chains 50.

Needless to say, in the process and the apparatus for effecting injection-molded-in foil decoration according to the present invention, the decoration sheet feeding means 5 may be provided by means other than a lengthy body, such as the endless loop chains 50 or others, whose length is unchangeable and can be curved. For example, in the mode wherein the decoration sheet S is fed by a constant length, in a case where the the decoration sheet fixing face is planar, and the decoration sheet S is conveyed linearly on a plane between the preheating position and the feed position, it is possible that the decoration sheet S is conveyed, pinched on the front and the back sides at both widthwise edges thereof Needless to say, if elongation of the decoration sheet S is negligible, the decoration sheet S may be conveyed by being pulled at the leading end thereof.

The preheater 4 for preheating the decoration sheet S at the preheating position is not specifically limited, as long as the decoration sheet S can be heated to a temperature less than a heat distortion temperature. Conventionally known various heating means, e.g., a heat line heater, a ceramic heater, a panel heater, a dielectric heater, etc. can be used. The preheater 4 is preferably of the type and incontiguous (non-touching) heating furthermore is by radiation heat, because no mark of the contact with the heating surface of the preheater 4 remains on the decoration sheet S or a finished decorated molding, and the heating is efficient. In FIG. 1 the preheater 4 is disposed so that the front side of the decoration sheet S (the side thereof to be contacted with injected resin is the back side) is incontiguously heated, but the preheater 4 may be disposed on the side of the back side. Preheaters 4 may be disposed on both sides of the decoration sheet S.

It is preferable that a temperature of the preheated decoration sheet S is less than a heat distortion temperature (for a 4.6 kgf/cm$^2$ flexural stress inaccordance with JIS K7207, hereinafter heat distortion temperature). This is because when the decoration sheet S is heated to a temperature greater than the heat distortion temperature, the decoration sheet S cannot retain a stable shape when the decoration sheet S is conveyed from the preheating position to the feed position, and the decoration sheet S cannot be stably fed onto the molds 12, 25. Even when the decoration sheet S is preheated and conveyed, or is conveyed with only both widthwise edges pinched and with the leading and the trailing ends and the central part set free, or with the leading end pulled, preheating the decoration sheet S to a temperature less than the heat distortion temperature permits the decoration sheet S to be fed stably, free from deformation, distortion, breakage, etc. and is especially effective in the latter conveyance mode in which the decoration sheet S is pulled. A preheating time is determined so that while one decoration sheet S is being heat-softened or being injection-molded, a next decoration sheet S is preheated in the preheating position. This is advantageous because the preheating itself does not add to a cycle time. The preheater 4 is set at a temperature that allows such preheating time to be set.

In other words, a temperature of the decoration sheet S conveyed from the preheater 4 up to the cavity surface 88 of the female mold 12 is kept in a range of less than a heat distortion temperature thereof and is preferably more than room temperature. Usually the temperature is set to be lower by about 10–40° C. than a heat distortion temperature of the decoration sheet S. In order to keep constant quality of a finished decorated molding of each molding shot, and a molding cycle time it is preferable to control temperatures of preheated decoration sheets S of respective shots to be constant on the cavity surface 88 of the female mold 12.

In order to control a temperature of the preheated decoration sheet S to be constant, it is a fundamental to keep constant an output (or a surface temperature) of the preheater 4, a heating time of the preheater 4 and a conveying time in which the decoration sheet S is conveyed from the preheater 4 to the parting face 14 of the female mold, the same molding machine, the same molding shape (mold shape), the same width and thickness of a decoration sheet, the same room temperature and the same preheater 4 are used. Values of the parameters, such as an output of the preheater 4, etc. and a temperature of a decoration sheet S are determined by performing experiments beforehand for each case.

Feedback control is preferable in a case where a decoration sheet S cannot be maintained correctly at a constant temperature due to various factor changes (disuniformity of a thickness of the decoration sheet S, inflow of outside air, etc.); a case where a time in which a decoration sheet S is opposed to the preheater 4 is longer than a reference time due to a trouble in the molding process, conditioning, etc.; a case where an output of the preheater 4 has been changed due to a change of processing conditions, such as a kind of a decoration sheet, a molding shape, etc.

Figure 6:
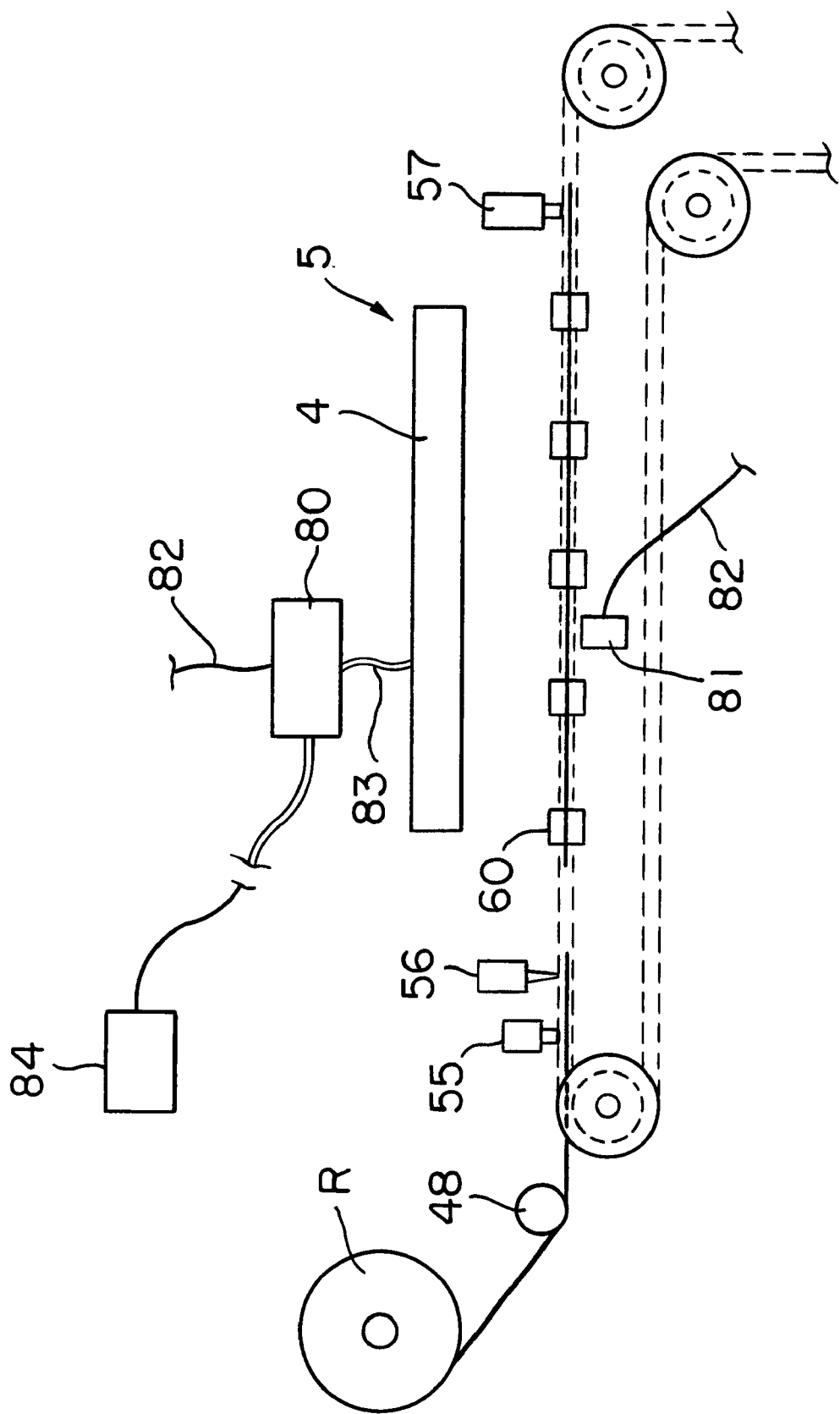
FIG. 6 is a view of the injection-molded-in foil decoration apparatus including the control means for the preheater.

As one example of the feedback control, as shown in FIG. 6, a temperature sensor 81 for sensing a temperature of a decoration sheet S is disposed near the preheater 4 of the sheet feeding means. On the other hand, the preheater 4 is of the type in which infrared radiation is formed from a ceramic surface heated by heating wires. Current (sinusoidal single-phase alternate current) supplied by an AC source 84 through a feeder line 83 is passed through control means 80 using a thyrister to have the current (electric power) controlled to be fed to the heating line (known material, such as nichrome wire or others) of the preheater 4.

As a control method, a temperature of a decoration sheet S measured by the temperature sensor 81 is converted into an electric signal and inputted to the control means 80 through a signal line 82. The control means 80 compares the current temperature of the decoration sheet S with a target value of the decoration sheet S inputted beforehand in the control means 80, and when a difference is present between both temperatures, a phase of a trigger pulse of the thyrister of the control means 80 is controlled so that the difference is converged to 0, whereby a charge time of the alternate current for one cycle is controlled to control an output of the preheater 4, a surface temperature of the preheater 4 and a temperature of the decoration sheet S.

The control means 80 may have a known structure and uses a known control process.

The temperature sensor 81 may be a contiguous sensor, such as a thermister, a thermo-couple or others, or an incontiguous sensor (an infrared sensor), such as a photo-electrical cell, a photoconductive cell or others.

The temperature sensor 81 is disposed on the side opposite to the preheater 4 for the decoration sheet S in FIG. 6 but may be disposed on the side of the preheater 4 for the decoration sheet S.

Figure 7:
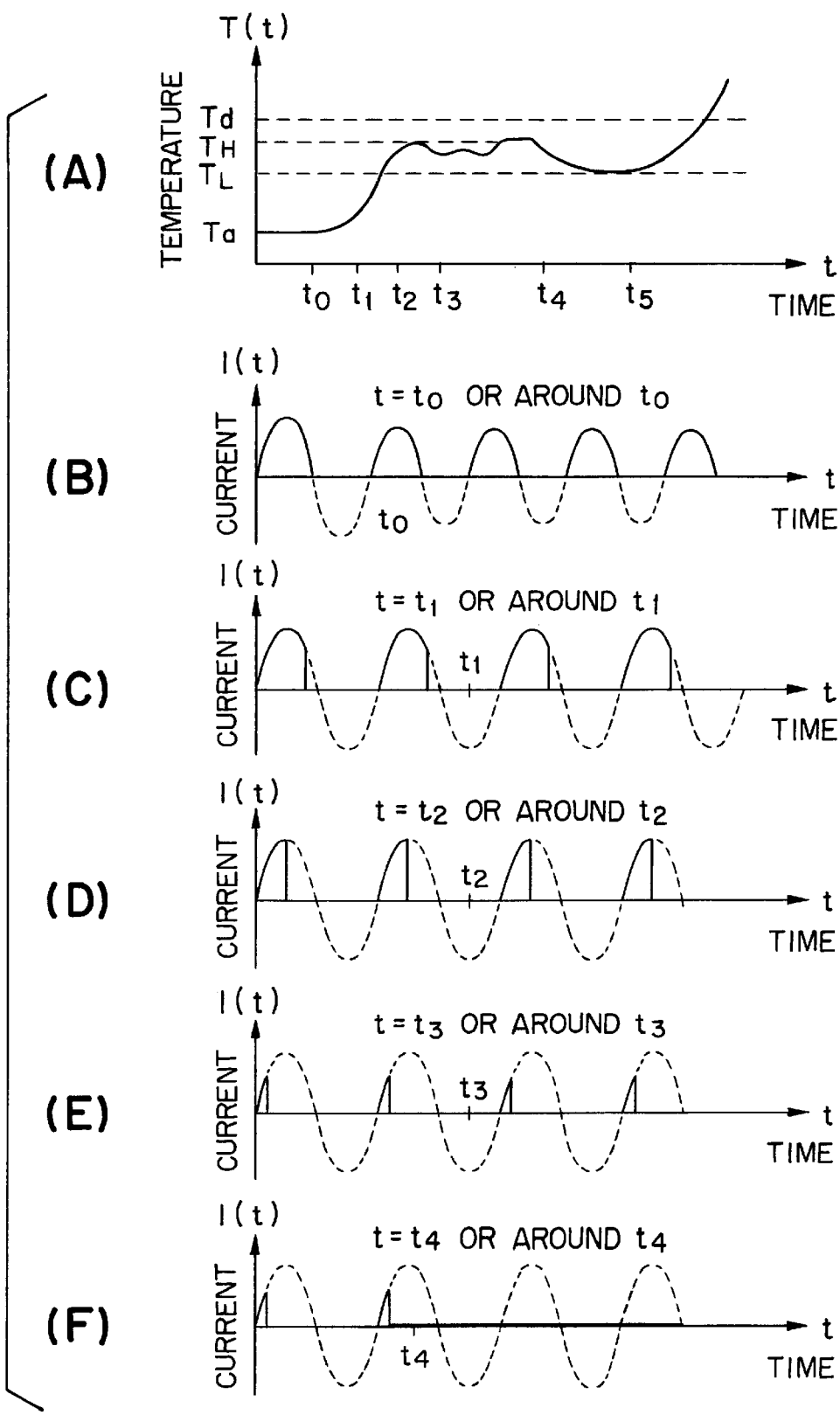
FIGS. 7(A) to (F) are views showing the process for controlling the preheater.

In one example of thyrister-controlling an output of the preheater 4, as shown in FIG. 6, a change of a decoration sheet temperature T(t) with respect to a time t is shown in FIG. 7(A). FIGS. 7(B)–7(F) shows waveforms of current I(t) fed to the preheater at respective points of the temperature control.

First, at a time t0, a decoration sheet S is conveyed to a position where the decoration sheet S is opposed to the preheater 4 on the sheet feeding means 5, and the decoration sheet S is pinched on both side edges by the sheet pinching chucks 60 and is cut into a length for one shot. At the time t0, alternate current I(t) rectified by the thyrister has been incessantly fed by a half cycle before the time t0. A maximum electric power has been fed to the heating line of the preheater 4, and a temperature of the ceramic radiation surface has a maximum value (FIG. 7(B)). Accordingly, the temperature T(t) of the decoration sheet S goes on rapidly rising after the time t0.

If the preheater 4 is kept at the maximum output, the decoration sheet temperature T(t) exceeds a heat distortion temperature Td by the time that the decoration sheet S is started to be conveyed from the sheet feeding means toward the cavity surface 13. Thus, phases of trigger pulses inputted to the thyrister of the control means 80 are shifted based on signals supplied by the temperature sensor 81 sequentially at a time t1, a time t2 and a time t3 as the temperature T(t) rises, whereby a charging time of alternate current of a half cycle (forward current) rectified by the thyrister is sequentially shortened as shown in FIGS. 7(C)–(E). As a result, electric power fed to the preheater 4 is decreased to decrease thermal energy per a unit time and a unit surface area, whereby a decoration sheet temperature T(t) is controlled to be constant between preset temperatures TH and TL. Needless to say, Ta<TL<TH<Td.

At a time t4, the electric power fed to the preheater 4 is stopped as shown in FIG. 7(F)(I(t))=0), and the decoration sheet S having a temperature between Th and TL starts to be conveyed toward the cavity surface 13 of the female mold 12. During this conveyance the temperature T(t) decreases slightly. However, at a time t5, the decoration sheet S has a temperature sufficiently higher than room temperature Ta, and then the decoration sheet S is fixed to the parting face 14 of the female mold 12 by the clamper 20 and starts to be heated by the heater 70 (see FIG. 1). After the time t5, a temperature T(t) of the decoration sheet S again rises and exceeds a heat distortion temperature Td to be softened (see FIG. 7(A)).

Figure 8:
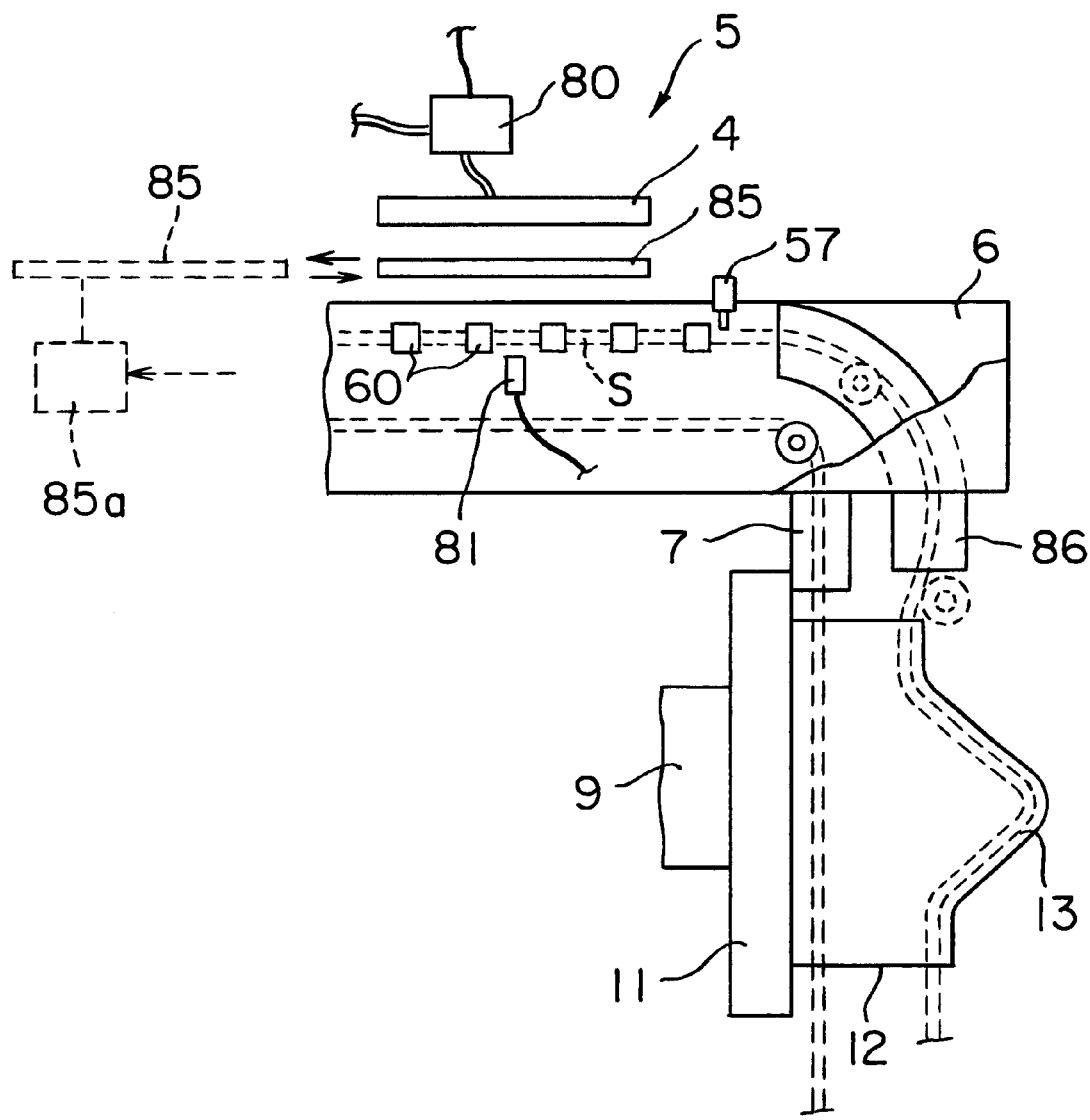
FIG. 8 is view of the apparatus for effecting injection-molded-in foil decoration including the heat shielding plate and the heat insulation hood.

Even when the electric power fed to the preheater 4 is stopped, a temperature of the radiation surface of the preheater 4 does not abruptly decrease. If the feed of thermal energy to a decoration sheet S should be quickly shut off (temperature increase of the decoration sheet S should be quickly stopped), as shown in FIG. 8, a heat shield plate 85 is inserted between the preheater 4 and the decoration sheets. In the example shown in FIG. 8, the heat shield plate 85 is withdrawn by a drive mechanism 85a, such as a hydraulic cylinder or others, to the stand-by position (outside a gap between the preheater 4 and a decoration sheet S) indicated by the dot line to stand by there while a decoration sheet S is being heated. When the radiation heat from the preheater should be shielded, the heat shield plate 85 is inserted between the preheater 4 and a decoration sheet S by the drive mechanism 85a controlled by the control means 80, as indicated by the solid line.

The heat shield plate 85 is formed of a substance which is heat resistant and reflects infrared radiation or a substance of low heat conductivity, or a combination of both substances. For example, a laminated material of a glass fiber or asbestos layer of low heat conductivity, and aluminium plates of high infrared radiation reflectivity and heat resistance laid on the front and the back sides thereof is exemplified.

In order to prevent a preheated decoration sheet S from lowering a temperature due to outside air during its conveyance from the preheater 4 to the female mold 12, it is possible that, as shown in FIG. 8, a hollow tubular heat insulation hood 86 which surrounds the endless loop chains 50 is disposed along the endless loop chain 50. In connection with "a heat distortion temperature of a decoration sheet" used in the present invention, in a case where a decoration sheet is formed of a plurality of layers (e.g., "substrate/a decoration ink layer"), a heat distortion temperature of the thickest one of the plural layers is employed as a heat distortion temperature of a decoration sheet.

This is because an action of a decoration sheet as a whole being softened/deformed depends mostly on an action of the thickest layer thereof.

On the other hand, the heater 70, as the sheet heating means, for heating a decoration sheet S fed on the molds 12, 25 may be conventionally known heating means, such as a ceramic heater, a panel heater or others, as is the preheater 4. The heater 70, which is the sheet heating means exemplified in FIG. 1, has a structure having a non-planar heating surface and and can space a decoration sheet equidistantly from the entire heating surface and incontiguously heats the same uniformly. In the structure of the apparatus shown in FIG. 1, the preheater 4 as the sheet preheating means, and the heater 70 as the sheet heating means 70 are independent of each other for the respective special purposes. The preheater 4 and the heater 70 are independent of each other, whereby they independently heat at a more suitable time, a more suitable temperature and a more suitable position.

It is preferable that a temperature of a decoration sheet heated on the molds 12, 25 equal to or is more than a heat distortion temperature (for 4.6 jgf/cm$^2$ flexural stress in accordance with JIS K7207). A heat distortion temperature is a minimum temperature necessary to heat and soften a decoration sheet S to vacuum-mold the decoration sheet S. Heating a decoration sheet S to a temperature equal to or more than a heat distortion temperature to soften the same makes the decoration sheet S plastically deformable enough to be conformed to a contour of the cavity 13 of the female mold 12. However, if a decoration sheet S is heated to a too high temperature and melted, the decoration sheet S is broken or much deformed. A temperature of a preheated decoration sheet S is preferably below a melting temperature (or a melting point).

The process and the apparatus for effecting injection-molded-in foil decoration according to the present invention in the mode exemplified in FIGS. 1 to 5 will be further detailed.

First, the leading end of web of decoration sheet S payed out from the roll R, which has been cut by a sheet cutter 56, is held by a sheet holding mechanism 55 in the form of, e.g., a sucker or others. When the sheet pinching chucks 60 of the endless loop chains 50 are located in the paying-out position, the leading end of the web of decoration sheet S held by the sheet holding mechanism 55 is held by a sheet draw-out mechanism 57 which slides a guide rail (not shown) extended in the Y-direction on the base frame 6, holds the leading end of the web of decoration sheet S held by the sheet holding mechanism 55 and is moved in the Y-direction to draw out the decoration sheet S for one shot. At this time, respective sheet pinching chucks 60 are in their pinch-releasing state with their associated rollers 68 pressed as will be described with reference to FIGS. 3 to 5. Next, the sheet pinching chucks 60 provided on the endless loop chains 50 pinch the decoration sheet S for one shot at both widthwise edges. When the pinching of the decoration sheet S is completed, the sheet draw-out mechanism 57 may release the pinch of the decoration sheet S. In this state, the decoration sheet S for one shot is cut off from the side of the roll R by the sheet cutter 56 into one piece of decoration sheet S. The endless loop chains 50 are moved in the Y-direction in accordance with a length of the decoration sheet S and a length of the preheater 4, and the decoration sheet S is fed from the pay-out position to a prescribed preheating position opposed to the preheater 4. This state is shown in FIG. 1.

Then, when required preheating of the decoration sheet S is completed, the endless loop chains 50 are advanced (in the direction of rotation indicating arrow added to the sprocket wheel 41 in FIG. 1) to convey the piece of the decoration sheet S for one shot pinched by the sheet pinching chucks 60 to a feeding position opposed to the parting face 14 of the female mold 12. Here the decoration sheet S is fixed to the parting face 14 by the clamper 20. Then, the endless loop chains 50 are driven backward to return a part thereof with the sheet pinching chucks 60 provided on to the pay-out position, and the endless loop chains 50 stand by for a piece of the decoration sheet S for a next shot. At this time, the female mold 12 and the male mold 25 are opened.

The parting face 14 of the molds used in this mode is non-planar. A pair of guide grooves 36 on the feeding side are formed in both widthwise edges of the female mold 12, extended up-to-down (in the Z-direction) and curved in conformity with the shape of the parting face 14. The guide grooves 36 guide the endless loop chains 50, the larger-diameter rollers 62, the smaller-diameter rollers 63, the sheet pinching chucks 60, etc. Also on the bottom side of the female mold 12, a pair of guide grooves 38 for guiding the endless loop chains 50, the larger-diameter rollers 62, etc. are formed in both widthwise edges, extended linearly up-to-down (in the Z-direction).

FIGS. 4 and 5 show sectional views of the female mold at the guide grooves 36 on the feeding side along the X-Y plane. As shown in these drawings, the guide grooves 36 on the feeding side have sectional shape which can define positions of the endless loop chains 50 and the sheet pinching chucks 60 in two direction normal to the sheet conveying direction. Each of the guide grooves on the feeding side has an intermediate wall 36A projected in the direction of width of the groove. That part of the guide groove 36 upper of the intermediate groove 36A (as viewed in the drawing) is an open groove 36a opened in the parting face 14, for defining the positions of the lower parts (stationary mounts) of the sheet pinching chucks 60. The larger-diameter rollers 62 and the smaller-diameter rollers 63 of the endless loop chains 50 are inserted and guided in the guide grooves with the intermediate wall 36A therebetween. Position restricting recesses 36d, 36c are formed in the intermediate wall 36A and in the bottom wall in which the larger-diameter rollers 62 are loosely inserted.

These position restricting recesses 36d, 36c, and the intermediate wall 36A restrict positions of the endless loop chains 50 and the sheet pinching chucks 60 in the sheet conveying direction, i.e., in two directions normal to the direction along the outwardly curved parting face 14.

As shown in FIGS. 3 to 5, each sheet pinching chuck 60 comprises the stationary mount 65 horizontally projected on the upper part of a support member 61, for being the back side (the lower side) of a decoration sheet S, and a movable presser member 66 mounted on a support plate 64 by a pin rotatably and positioned upwardly of the parting face 14. The movable presser member 66 is normally urged by a compression coil spring 67 in a direction in which the decoration sheet S is pinched in cooperation with the stationary mount 65. Accordingly, the decoration sheet S pinched by the sheet pinching chuck 60 can be moved substantially along the outwardly curved parting face 14 of the female mold 12.

A roller 68 is provided on the side of the movable presser member 66 near the endless loop chain 50. The roller 68 is depressed into a recess 21 for preventing interference formed in the clamper 20 when a decoration sheet S is pressed fixedly to the parting face 14 of the female mold 12. When the roller 68 is depressed into the recess 21 of the clamper 20, the movable presser member 66 leaves the stationary mount 65 against an urging force of the compression coil spring 67, and the sheet pinching chuck 60 releases the decoration sheet S (see FIG. 5).

For applying a tension as required to the endless loop chain 50 to avoid causing the endless loop chains 50 to sag in the mode shown in FIG. 1, a pair of sprocket wheels 46 which is in press-contact with the endless loop chains 50 for applying a tension is disposed below the female mold 12. A position (in the Y-direction in FIG. 1) of the sprocket wheels 46 for applying a tension is adjusted with respect to the endless loop chains 50 to, thereby, adjust a tension of the endless loop chains 50. Positions of the endless loop chains 50 and the sheet pinching chucks 60 can be uniquely determined. As indicated by the phantom line in FIG. 1, a pair of sprocket wheels 47 for applying a tension may be provided upper of the female mold 12 (in the upstream).

Then, the decoration sheet S fixedly pressed against the parting face 14 of the female mold 12 by the clamper 20 is heated and softened. In the mode exemplified here, because the parting face 14 of the female mold 12 is substantially outwardly curved, as shown in FIG. 1, the heater 70 for the heating and softening comprises two heater plates, i.e., a first heater plate 71 and a second heater plate 72, each rotatably supported on a support case 75. The two heater plates 71, 72 face to the surface of the fixedly curved decoration sheet S to heat the sheet S by substantially equidistant and incontiguous radiant heating.

The heater 70 shown at the heating position in FIG. 1 is reciprocated by a hydraulic cylinder, a guide rail and a drive mechanism, or other means between the heating position shown in FIG. 1 when heating, and a withdrawn position outside the mold 12, 25 (e.g., upper of the mold 12, 25 or lateral of the mold 12, 25) when the heater 70 is not necessary at the time that the molds are clamped, etc.

Then, the decoration sheet S is heated up to a temperature equal to or greater than a heat distortion temperature thereof and heat softened. The decoration sheet S is then air-drawn through the vent openings 13a formed in the female mold 12 after the decoration sheet S has been heat softened or after some time since the start of the heat softening so as to vacuum-form the decoration sheet S to conform the decoration sheet S to the surface 88 of the cavity 13 of the female mold 12 for preforming. The vacuum-forming includes vacuum/pressure-forming.

After the preforming of the decoration sheet S, the heater 70 is moved/withdrawn from between both molds 12, 25 to the withdrawn position outside the mold. Then, the female mold 12 and the male mold 25 are clamped, and fluidized resin is poured into the cavity 13 defined by both molds 12, 25. Usually a runner and a gate (not shown) communicating with an injection nozzle are provided on the side of the male mold 25, and through the runner and the gate, fluidized resin is injected into the cavity. After the injected resin is solidified, the mold is opened to space the female mold 12 and the male mold 25 from each other.

Then a decorated molding with the decoration sheet S can be formed. Especially in a case where the decoration sheet S is a laminate sheet, an excess part of the decoration sheet S outside the peripheral edge of the decorated molding is trimmed.

The decoration sheet S used in the present invention is not specifically limited, as long as laminate sheets and transfer sheets are used, and various conventionally known decoration sheets can be used. The present invention is effective especially to laminate decoration sheets S, which are in most cases thicker than transfer sheets. Among laminate decoration sheets S, thick decoration sheets are more preferable. Even in cases where such thick decoration sheets are used, the present invention can form decorated moldings without increasing a cycle time and with good productivity. In a case where a decoration sheet S is incontiguously preheated and heated, even the decoration sheets S including adhesive layers can be stably fed without the adhesive layers being heat-fused to the heaters, and decorated moldings free from appearance defects due to the thermal fusion can be formed.

A laminate decoration sheet S is a sheet having the substrate sheet decorated with prints, etc., such as a decorative layer or others representing picture patterns, letters, etc. A substrate sheet of a decoration sheet S is provided typically by a moldable resin sheet. The resin sheet can have a single layer or a laminated body of two or more than two layers of a thermoplastic resin, e.g., polyamide resin, such as nylon, ethylene-isophthalate-terephthalate copolymer, polyester resin, such as polybutylene telephthalate or others, polypropylene, polyethylene, olefin resin, such as olefin-based thermoplastic elastomers, polyfluoride resin, such as vinyl polyfluoride and vinylidene polyfluoride vinyl chloride resin, acrylic resin, ABS resin (Acrylonitrile-Butadiene-Styrene copolymer), or others.

The decorative layer is a functional layer, etc., such as a paint applied layer which has printed patterns, such as letters, patterns, etc. or which is opaquely colored or transparent (colored or non-colored), a rigid layer, an anti-fogging layer, a electrically conducting layer, or others.

Such decorative layer is releasably laminated on a substrate sheet, and after injected resin and a decoration sheet S have adhered to each other, the substrate sheet is released. In this case the decoration sheet S can be referred to as a transfer sheet. In laminating such decorative layer releasably on a substrate sheet, known art of, e.g., providing a release layer on the substrate can be sheet can be used.

Molding resins used in the present invention can be known molding resins used in the injection-molded-in foil decoration and are not specifically limited. For example, thermoplastic resins can be polypropylene, polyethylene, olefin resin, such as olefin-based thermoplastic elastomer, vinyl chloride resin, acrylic resin, ABS (Acrylonitrile-Butadiene-Styrene copolymer), styrene resin, AS (Acrylonitrile-Styrene copolymer) resin, polycarbonate resin, etc. Curable resins can be unsaturated polyester resin, curable acrylic resin, two-part curing urethane resin, epoxy resin, etc.

A thermoplastic resin is heat melted to be injected in its fluid state. A curable resin is heated as required to be injected in its fluid state as an uncured liquid.

The present invention will be further detailed by means of an example and a control.

EXAMPLE

A decorated molding having a decoration sheet S laminated on the surface was formed by the apparatus for effective injection-molded-in foil decoration shown in FIGS. 1 to 5.

The decoration sheet S was prepared by forming, on one side of a 125 μm-thick methylmethacrylate-butylmethacrylate copolymer-based transparent acrylic resin film, a decorative layer of a combination of three-colored grain patterns formed of an ink containing an acrylic resin binder with a coloring agent, such as an iron oxide red or others, by adhering to the decorative layer, a 500 μm-thick brown ABS resin sheet (Its heat distortion temperature is 103° C. for 4.6 jgf/cm$^2$ flexural stress in accordance with JIS K7207), and by forming an 4 μm-thick adhesive layer of vinyl chloride-vinyl acetate copolymer on the surface of the ABS resin sheet. The ABS sheet is the back side of the decoration sheet S, i.e., the side onto which a resin is to be injected.

For forming a molding, an injection mold for molding a rectangular parallelopiped mold of a 300 mm-length, a 200 mm-width and a 40 m-depth was prepared. The female mold 12 of the mold had vent openings 13a for drawing air in the mold for the sheet preforming, and had the guide grooves 36, 38 for guiding the endless loop chains 50 of the sheet feeding means 5. The parting face 14 of the female mold 12 was not curved but planar.

Heat-resistant ABS resin was used as a molding resin. A temperature of the injection resin was 240° C., and a temperature of the mold was 60° C.

In the molding, first, a web of the decoration sheet S was payed out from the roll R. The leading end of the web of the decoration sheet S held by the sheet holding mechanism 55 was held by the sheet draw-out mechanism 57, and the both side edges of the decoration sheet S went through the sheet pinching chucks disposed on both side edges, which are in their released state. Then the decoration sheet S was payed out by a length of one shot. The sheet pinching chucks 60 pinched the decoration sheet S, and then the sheet draw-out mechanism 57 released the decoration sheet S. The decoration sheet S payed out into this state was cut at the downstream by the sheet cutter 56 into one piece of the decoration sheet S for one shot. Below the decoration sheet S at this position, the preheater 4 in the form of a ceramic panel heater was spaced from the decoration sheet S by 50 mm. A surface temperature of the preheater 4 was set at 150° C., and the decoration sheet S was heated for 20 seconds incontiguously by radiant heat of the preheater 4. The decoration sheet S was heated to 80° C. at a point after 20 seconds of heating. This preheating step of the decoration sheet S does not add to a cycle time because the preheating step was performed during the performing and the injection molding of a previous decoration sheet S. Then, the endless loop chains 50 were advanced to convey the decoration sheet S pinched and preheated onto the parting face 14 of the female mold 12. The decoration sheet S from the preheater to the parting face was fixedly pressed against the parting face 14 by the clamper 20, and the feed of the decoration sheet S onto the molds 12, 25 was completed. The feed of the decoration sheet S took 10 seconds, and in 10 seconds of the feed the temperature of the decoration sheet S dropped from 80° C. to 60° C. The heater 70, which was an independent heater of the preheater 4 and was in the form of a ceramic panel heater, was advanced inbetween the female and the male molds 12, 25. A surface temperature of the heater 70 was raised to 350° C., and the heater 70 heated and softened the decoration sheet S incontiguously, spaced from the decoration sheet S by 40 mm. The decoration sheet S was heated to 140° C. after 10 seconds from the start of the heating, which was a suitable temperature for the vacuum molding. The vacuum-molding was effected in the female mold 12 to conform the decoration sheet S to the cavity surface 88 of the female mold 12, and the preforming was completed. Then the heater 70 was withdrawn outside the molds 12, 25, and the both molds 12, 25 were clamped, and the injection resin heat melted was injected into the cavity 13 defined by both molds 12, 25. After the resin cooled and solidified, the mold was opened, and a decorated molding with the decoration sheet S laminated was formed.

[Comparison]

In the comparison, a decorated molding was formed without preheating the decoration sheet S. In the case where the preheating was not performed, it took 20 seconds to heat the decoration sheet S by the heater. In comparison with the example, the heating time was longer by 10 seconds. The cycle time was accordingly increased.

① According to the process and the apparatus for effecting injection-molded-in foil decoration, a decoration sheet S has been preheated when it is fed to the molds 12, 25, whereby a time in which the decoration sheet S is heated to a temperature for the performing can be short. Accordingly a time during which the molds are opened can be short. As a result, a cycle time can be short, which can improve productivity.

② When a decoration sheet S is fed to the molds 12, 25, the decoration sheet S is pinched at at least both side edges as viewed in the direction of conveyance of the decoration sheet S and is fed with a widthwise length and a length parallel to the direction of conveyance retained uniform, whereby the preheated decoration sheet S has the widthwise length and the length parallel to the direction of conveyance retained uniform, and can be fed to the molds 12, 15, completely free from deformation and distortion. The decoration sheet S can be fed on the mold very stable.

A decoration sheet S is incontiguously preheated and heated, and is never fused to the heaters at the adhesive layer, etc. whereby the decoration sheet S is free from unstable feed to the molds 12, 25, and the decorated molding is free from defective appearances with marks of contact of the decoration sheet to the heaters.

What is claimed is:

1. An apparatus for effecting injection-molded-in foil decoration, said apparatus comprising:

a mold including a cavity surface defining a cavity for a decoration sheet to be positioned therein, and suction means provided in the cavity surface, for vacuum-drawing the decoration sheet, a fluid resin being injected in the cavity of the mold to be adhered to the decoration sheet;

sheet preheating means provided outside the mold, for preheating the decoration sheet before being fed to the mold to a temperature less than a heat distortion temperature of the decoration sheet;

sheet heating means positioned at a heating position facing the mold for heating the decoration sheet preheated and fed in the mold to a temperature equal to or greater than the heat distortion temperature of the decoration sheet; and sheet feeding means for feeding the decoration sheet preheated by the sheet preheating means to the mold.

2. The apparatus for effecting injection-molded-in foil decoration according to claim 1, wherein the sheet feeding means includes chucks for holding the decoration sheet at side edges thereof that are parallel to a direction in which the decoration sheet is conveyed.

3. The apparatus for effecting injection-molded-in foil decoration according to claim 1, wherein the sheet preheating means and the sheet heating means heat the decoration sheet, being spaced from the decoration sheet by a prescribed distance.

4. The apparatus for effecting injection-molded-in foil decoration according to claim 1, wherein a temperature sensor is disposed in the vicinity of the sheet preheating means, for detecting a temperature of the decoration sheet; and control means is provided for controlling the sheet preheating means, based on the signal from the temperature sensor.

5. The apparatus for effecting injection-molded-in foil decoration according to claim 1, wherein a heat shield plate is disposed in the vicinity of the sheet preheating means, which is movable from a position between the decoration sheet and the sheet preheating means, and a stand-by position thereof spaced from the sheet preheating means.

6. The apparatus for effecting injection-molded-in foil decoration according to claim 5, wherein the heat shield plate is driven by a drive mechanism controlled by the control means.

7. The apparatus for effecting injection-molded-in foil decoration according to claim 1, wherein a heat insulation hood is disposed between the sheet preheating means and the mold, for covering the decoration sheet fed by the sheet feeding means.

* * * * *